United States Patent
Flogård et al.

(10) Patent No.: US 10,384,537 B2
(45) Date of Patent: Aug. 20, 2019

(54) METHOD AND DEVICE FOR TANDEM- OR MULTIPLE-AXLE DRIVE FOR A VEHICLE

(71) Applicant: VOLVO TRUCK CORPORATION, Göteborg (SE)

(72) Inventors: Anders Flogård, Frändefors (SE); Mats Fagergren, Kungälv (SE); Lena Larsson, Västra Frölunda (SE); Jan Öberg, Göteborg (SE)

(73) Assignee: Volvo Truck Corporation, Göteborg (SE)

( * ) Notice: Subject to any disclaimer, the term of this patent is extended or adjusted under 35 U.S.C. 154(b) by 139 days.

(21) Appl. No.: 15/535,069

(22) PCT Filed: Dec. 23, 2014

(86) PCT No.: PCT/SE2014/000158
§ 371 (c)(1),
(2) Date: Jun. 12, 2017

(87) PCT Pub. No.: WO2016/105254
PCT Pub. Date: Jun. 30, 2016

(65) Prior Publication Data
US 2017/0361707 A1    Dec. 21, 2017

(51) Int. Cl.
*B60K 17/35* (2006.01)
*B60K 17/36* (2006.01)
(Continued)

(52) U.S. Cl.
CPC ........ *B60K 17/3505* (2013.01); *B60C 23/061* (2013.01); *B60K 17/35* (2013.01);
(Continued)

(58) Field of Classification Search
None
See application file for complete search history.

(56) References Cited

U.S. PATENT DOCUMENTS 4,825,368 A    4/1989 Itoh et al.
5,711,389 A    1/1998 Schlosser
(Continued)

FOREIGN PATENT DOCUMENTS

DE    102006060842 A1    6/2007
GB    1537345    12/1978
(Continued)

OTHER PUBLICATIONS

International Search Reports (dated Sep. 10, 2015) for corresponding International App. PCT/SE2014/000158.
(Continued)

*Primary Examiner* — Jacob S. Scott
*Assistant Examiner* — Timothy Hannon
(74) *Attorney, Agent, or Firm* — WRB-IP LLP

(57) ABSTRACT

A wheel suspension system and a method for controlling the system. The wheel suspension system includes a first axle provided with wheels and a second axle provided with wheels. The first axle is connected to a first driveshaft portion via a first differential 6a and the second axle is connected to a second driveshaft portion via a second differential 6b. The system further includes angular speed sensors designed to detect the rotational speed of the axles, and/or the rotational speed of the respective wheels. The angular speed sensors are connected to an electronic control unit (ECU) which is designed to calculate a difference between the angular speed of the first and second axles, and/or a difference between the angular speed of the respective wheels by the use of input data from the angular speed sensors. The speed difference can be used as an indication of different wheel radius of the wheels. The system includes a coupling, e.g. a dog clutch arrangement, arranged in the driveshaft and positioned between the first and second drive shaft portions for changing the first and second drive shaft portions between being drivingly connected and disconnected.

10 Claims, 6 Drawing Sheets

(51) Int. Cl.
*B60K 23/08* (2006.01)
*B60C 23/06* (2006.01)

(52) U.S. Cl.
CPC .............. *B60K 17/36* (2013.01); *B60K 23/08* (2013.01); *B60K 23/0808* (2013.01); *B60K 2023/085* (2013.01); *B60W 2530/20* (2013.01); *B60Y 2200/14* (2013.01); *B60Y 2300/188* (2013.01); *B60Y 2400/3032* (2013.01)

(56) References Cited

U.S. PATENT DOCUMENTS

| | | |
|---|---|---|
| 5,927,422 A | 7/1999 | Schakel |
| 2002/0036567 A1 | 3/2002 | Larson |
| 2002/0179345 A1 | 12/2002 | Bell |

FOREIGN PATENT DOCUMENTS

| | | |
|---|---|---|
| JP | 2003226150 | 8/2003 |
| JP | 2013536116 | 9/2013 |
| WO | 2013167148 A1 | 11/2013 |

OTHER PUBLICATIONS

International Preliminary Report on Patentability (Feb. 14, 2017) for corresponding International App. PCT/SE2014/000158.
Japanese Official Action (dated Nov. 27, 2018) for corresponding Japanese App. 2017-533851.
European Official Action (dated Oct. 4, 2018) for corresponding European App. 14 909 179.7.

METHOD AND DEVICE FOR TANDEM- OR MULTIPLE-AXLE DRIVE FOR A VEHICLE

BACKGROUND AND SUMMARY

The invention relates to a method and device for a tandem drive, or multiple drive axles for a vehicle. The invention is in particular directed to detection of differences between the rolling radii of wheel pairs on different driven axles in a tandem or triple axle arrangement, i.e. in a double or triple bogie arrangement. The invention can be applied in heavy-duty vehicles, such as trucks, buses and construction equipment. Although the invention will be described with respect to a truck, the invention is not restricted to this particular vehicle, but may be used for any kind of vehicle in which there is a double or triple bogie arrangement including two driven axles present.

For certain vehicles there is a desire to provide the vehicle with more than one axle at certain locations. This feature is in general due to a desire to distribute the weight of the vehicle to several tires and the vehicles may be provided with double bogies or triple bogies, i.e. two or three axles whereof each one provided with wheel pairs located adjacent to each other.

There is in many cases a desire to be able to provide a propulsion force to at least two of these axles such that a so called tandem axle is used. In a tandem axle are two axles connected to a drive shaft and both axles may provide a propulsive force for the vehicle. In case of having 3 axles, and three wheel pairs in the bogie arrangement, could all three axles be driven axles in a so called triple axle. The set up in triple bogie arrangement could also be that two of the axles and its associated wheel pairs form a tandem axle while the third axle is a non-driven axle.

When using several driven axles connected to each other in a tandem axle or triple axle arrangement may the arrangement provide an efficient traction which in particular is useful when the vehicle is heavy loaded and/or at take-off and/or in uphill condition and/or travelling on loose or slippery surface conditions. The use of several pairs of traction wheels during these conditions may be of great advantage. However, during travel conditions on high-ways or under ordinary road conditions in general may there be a problem in using a tandem axle or triple axle since they are driven by the same drive shaft and thus propelled to rotate with the same rotational speed. In this case, even small differences in the rolling radius of the wheel pairs of a tandem axle or triple axle may cause a rather large wear of the tires and induce stress in the driven axles. One way of reducing this problem is to use a longitudinal differential (also commonly called an inter-axle differential) working between the driven axles such that they may rotate at different speed by the use of the longitudinal differential. However, to include an extra differential, to allow a speed difference between different axles, in the wheel suspension arrangement will contribute with an additional cost as well as a more bulky and heavy arrangement which could be hard to fit in the suspension arrangement. In US 2002/0179345 is described a tandem drive axle arrangement which is designed to work without a longitudinal differential working between front and rear driven axles in the tandem axle. It is therein further described how differences in the tire rolling radii is monitored in order to control tire pressure for correcting axle speed differences.

Even though US 2002/0179345 discloses a tandem axle system and a method for operating such a system in order to reduce undesired wear of tires while also providing an efficient propulsive force to the vehicle is it desired with an improved system being able to provide a desired traction force for a multitude of driving conditions and vehicle parameters.

It is desirable to provide a wheel suspension system comprising a driven multi-axle and a method for controlling such a system, which system and method provide for an improved functionality and efficiency under a wide variety of driving conditions.

A wheel suspension system according to an aspect of the present invention comprises a first axle, provided with a first wheel and a second wheel, and a second axle, provided with a third wheel and a fourth wheel. This first and second axle are driven axles and forms part of a tandem axle or a multiple axle. By tandem axle (or multiple axles) is meant a propulsion arrangement in which two axles (or multiple axles) are powered by a common drive shaft system. In the following, the system will be focused on tandem axle system even though it is understood that there may be further driven axles included in the wheel suspension system. Hence, the driveshaft comprises a first portion connected to the first axle via a first differential and a second portion connected to the second axle via a second differential. These differentials are thus arranged to work transversally, i.e. to allow differentiated speed of the wheel pairs of the respective wheel axles and not to differentiate the speed between the different axles.

The wheel suspension system further comprises angular speed sensors designed to detect the rotational speed of the first and second axles and/or the rotational speed of the respective wheels of the first and second axles. By angular speed sensors is meant any kind of sensors being able to sense or indicate a parameter which can be used to compute or detect the rotational speed of an axle and/or wheel. The angular speed sensors used could for example be the same sensors which are used for an Anti-locking Brake System (ABS) for detecting locking of wheels when braking or for detecting slip in traction control. It could also be other kind of angular speed sensors mounted on the wheel axles, wheels, gearbox, engine or other parts of the powertrain suitable for detecting the angular speed of the axles and/or wheels.

The angular speed sensors are connected to an electronic control unit (ECU) which receives input from the angular speed sensors. The ECU is designed to use the input from the angular speed sensors in order to calculate a difference between the angular speed of the first and second axles and/or a difference between the angular speed of the respective wheels of the first and second axles. Depending on the information from the angular speed sensors, and possibly further information concerning vehicle and/or driving conditions, the ECU can be programmed to send output signals to control the wheel suspension arrangement or to alert or inform a driver of appropriate measures to be made in response to the prevailing conditions.

The wheel suspension system also includes a coupling arranged in the driveshaft and positioned between said first and second drive shaft portions for changing the first and second drive shaft portions between being drivingly connected and disconnected. The coupling can comprise any suitable device, such as a claw clutch, a dog clutch or a friction/disc clutch, which may change between being disengaged and being positively engaged. Hence, this feature enables the possibility to completely disconnect the first and second driven axle from being drivingly connected. This feature involves a number of advantages compared to the system disclosed in US 2002/0179345. An obvious advantage is that it is easy to measure the angular speed for the first respective second axle with a better accuracy. In US 2002/0179345 the driven axles are constantly connected whereby it should be a more delicate problem to accurately measure a difference in the rotational speed of the axles and/or wheels by angular speed sensors. Since the axles are connected together and there is no differential working between the axles, the axle speed should be the same for both axles and the wheels are forced to slip or spin. In addition, the possibility to disconnect the axles means that the coupling can be disconnected if it is indicated that the angular speed difference between the axles, or wheel, are above a prescribed value. There will in this case be a loss of traction force from the disconnected axle but the vehicle may avoid to be subjected to friction forces caused by a pair of driven axles being in a condition where they should rotate at different speeds in order to represent the same vehicle speed.

In order to further improve the functionality of the wheel suspension arrangement it could be provided with a lifting mechanism acting on one of the driven axles, e.g. the first axle. The lifting mechanism is designed to be able to lift the axle and shift the position of the axle from a first position in which its associated wheels are in contact with the ground and a second position in which the associated wheel pair is lifted above the ground surface so as to not be in contact with the ground. It should be noted that in the subsequent text the term "first axle" can serve as an example of a liftable axle. However, the liftable axle can be located as the foremost axle, or pusher axle, (closest to the front portion of the vehicle), as the rearmost axle, or trailing axle (closest to the rear portion of the vehicle), or as any axle between the foremost and rearmost axles. The latter example relates to cases where the wheel suspension arrangement comprises more than two axles. To be noted, more than one axle can be liftable and the invention disclosed herein is suitable for any combination of liftable and non-liftable axles in the wheel suspension arrangement.

This feature will thus enable the possibility to use the lifting action of an axle out of contact with the ground, if it is decided that the use of the first and second axle for propulsive purposes is considered not suitable, e.g. due to a difference in the rotational speed of the axles for the same vehicle speed. However, in many cases is it more desired to control the liftable axle, e.g. the first axle, to be maintained in its ground engaging, lowered position due to a desire to use an additional axle for load sharing. In this case the liftable axle can be used for dividing the load between axles and be controlled to not be drivingly connected to the engine while another axle, e.g. the second axle, is drivingly connected to the engine via the driveshaft. Lifting and lowering of the liftable axle, as well as the connecting/disconnecting of an axle or axles is normally performed when the vehicle is stationary. Typically, the axle is lowered and connected prior to loading, in order to avoid overloading other axles, and is lifted and disconnected after unloading, in order to reduce tire wear and to facilitate launch under slippery conditions. Allowing measurement to be performed by, for instacne, delaying axle lift or axle connection is possible but undesirable for the said reasons. However, if the axle or axles to be measured are connected at the time of launch and/or the vehicle is travelling with a lowered axle due to the current load, then measurement can still be carried out by performing a brief, temporary disconnection of one or more shafts to allow measurement of angular speeds. Such a measurement is preferably carried out when the transmission is operated at a light load, e.g., when travelling at constant speed on a flat road or a slight negative grade.

Lifting an axle out of contact with the ground is however beneficial when there is no problem with different axle rotational speed with respect to the driven axles and can be used to save fuel in ordinary driving modes. However, the tires of the lifted wheels will be subject to less wear and it may therefore be even more important to include the feature of keeping track of different angular speed of the axles in this case, since an angular speed difference may arise from the tires of the respective axles being used differently or being worn at different rates.

As mentioned earlier, the wheel suspension system may comprise a third driven axle connected to a third pair of wheels (a fifth wheel and a sixth wheel) which can also be provided with angular speed sensors designed to detect the rotational speed of the third axle and/or the rotational speed of the respective wheels of the third axle. This third axle is connected to the same driveshaft as the first and second axle. The third axle is connected to the drive shaft system via a third differential for allowing the third wheel pair to rotate at different speeds. The system can be provided with a second coupling in the driveshaft for being able to disconnect the third axle from the first and/or second axle. In this example, the first axle, which serves as an example of a liftable axle, could be the foremost, or pusher axle, the rearmost, or trailing axle, or the intermediate axle located between the pusher axle and trailing axle. In the case of the pusher axle being a liftable axle, a further coupling can be provided between the pusher axle and the drive shaft (transmission output shaft). The vehicle can then be driven by a driven front axle or by a driven axle located to the rear of the pusher axle and having a separate connection to the drive shaft. If desired, the wheel suspension system may comprise further driven axles as well as further non-driven axles.

As indicated above, the wheel suspension system may comprise at least one driven front axle connected to a fourth pair of wheels (a seventh wheel and an eighth wheel) which can also be provided with angular speed sensors designed to detect the rotational speed of the driven front axle and/or the rotational speed al the respective wheels of the driven front axle. This axle is connected to the same driveshaft as the two or more driven rear axles. The driven front axle is connected to the drive shaft system via a fourth differential for allowing the fourth wheel pair to rotate at different speeds. The system can be provided with a third coupling in the driveshaft for being able to disconnect the driven front axle from the driven rear axles. The system can be designed such that each driven wheel is provided with a respective angular speed sensor for detection of the angular speed of each wheel. By including this feature it will be possible to evaluate the actual angular speed of each wheel and detect not only inconsistencies between the speeds of different axles but also keep track of each individual wheel when performing the control of the wheel suspension system. The ECU may thus indicate or send out control signals detection of conditions relating to specific wheels.

The wheel suspension system can be used for and comprised in a multitude of vehicles. It is in particular suitable for trucks designed to be heavy loaded and/or to be used for vehicles performing heavy work in poor road conditions.

The invention also relates to a control method for a wheel suspension system including a multi-drive axle, e.g. tandem axle, for a vehicle. The wheel suspension system comprises at least two driven axles whereof each axle is provided with a pair of wheels. The axles are connected to a driveshaft via differentials and the driveshaft comprises a coupling positioned between each differential connected to the driveshaft so as to divide the driveshaft into different driveshaft portions. The controllable coupling (or couplings, if several are present) can change between being engaged or disengaged such that the different driveshaft portions and its connected driven axles switch between being drivingly connected and disconnected to each other. The wheel suspension system further comprises angular speed sensors designed to detect the angular speed of the axles and/or said wheels connected thereto. The control method comprises the following steps, which is exemplified for a tandem axle, i.e. a wheel suspension system comprising two driven axles.

In a first step the coupling is controlled to be disconnected such that a first drive shaft portion, comprising a first differential connected to a first driven axle, is drivingly disconnected from a second drive shaft portion, comprising a second differential connected to a second driven axle. In this state may thus the first and second axles rotate without influencing the speed of the other axle. In general will this mean that one axle is totally disconnected and may rotate freely independent of a power source, e.g. an Internal combustion engine (ICE), while the other axle is connected to a power source. Also the other axle could be disconnected to reduce the risk for slip and thus being able to measure a correct value of the angular speed of that axle. However, the other axle could be still connected to the power source and the measurement could be set to take place during a sequence when a driving or braking torque are within prescribed values in order to avoid slip or spin of the wheels when performing the measurements. As can be readily understood, a suitable occasion for performing measurements is when there is no torque applied at all, neither propulsive nor braking torque.

In a subsequent step, the angular speed of the axles and/or the wheels connected thereto is detected by the angular speed sensors while the driven axles are drivingly disconnected from each other.

In a subsequent step, the detected angular speed of the axles and/or the wheels connected thereto is used in order to calculate an angular speed difference between the angular speed of the first and second axles and/or a difference between the angular speed of the respective wheels of the first and second axles.

In a further subsequent step, the calculated angular speed difference between the different axles and/or wheels is compared with reference values to establish a comparison of the speed differences.

In a final step, the comparison of the angular speed difference is used as an indication of different wheel radius and triggers a warning signal and/or a control action in case the angular speed difference is outside an allowable value. By indication of wheel radius is herein meant to include measurements or indications of the circumference of the wheels, rolling radius or other parameters being related to the wheel radius. There can be different control actions depending on the magnitude of the difference and/or driving conditions and vehicle characteristics. It may for example be allowed, or indicated to be suitable, to use both the first and second axle for propulsive power if the vehicle is driving at rather low speed on loose ground even though the speed difference of the axles are above a certain limit while it is indicated that both axles not should be used when driving on an ordinary road above a certain speed limit, even though it can be allowed to drivingly connect both axles. Above higher levels of speed difference, and possibly also in dependence of road or driving conditions, could a control system prevent a pair of axles having too large speed differences to be allowed to be drivingly connected.

A speed difference between a pair of axles may also be used as an indication of tire wear and could for example alert a driver to check the tire status. Hence, the result of the measurements of the angular speed could be either a direct control signal to the wheel suspension system (or to some part of a vehicle) or to alert a driver of a status or feature to be checked.

The control method described above can be used for a wheel suspension system comprising a lifting mechanism acting on one of the axles, e.g. the first axle. The lifting mechanism could thus be designed to be able to lift the first axle in order to shift the position of the first and second wheels between being in a working position in contact with the ground surface and being lifted up to be in a resting position above a ground contact level.

In case the wheel suspension system comprises a lifting mechanism as described above, the control method may include the following steps to precede method steps described above. In a first step the first axle is lowered from an up-lifted resting position, in which the wheel pair of the first axle is above a ground contact level, to a lowered working position, in which the wheels are in contact with the ground. This operation is performed while the coupling is disconnected such that the first axle is drivingly disconnected from the second axle. In the next step, the coupling is maintained disconnected to keep the driven axles drivingly disconnected. The axles are drivingly disconnected at least until it is indicated that the detected angular speed values from the angular speed sensors, indicating the angular speed of the first axle and/or its wheel pairs, are stabilized. The wheel speed is in generally stabilized within one or a few seconds from the moment the wheels come into contact with the ground.

In case the angular speed difference of a pair of axles is outside an allowable value or a critical upper limit, one control action could be to keep these axles drivingly disconnected from each other. This control action could be dependent on further parameters, e.g. load, vehicle speed and road/surface conditions.

In case the wheel suspension system is provided with a lifting arrangement as described above, and the angular speed difference is outside a critical upper limit, the liftable axle (first axle) could be controlled to be lifted to an up-lifted position in which its wheel pair is above ground level and not is in contact with the ground. This control action could be dependent on further parameters, e.g. load and permitted axle pressure. However, even though a wheel suspension arrangement comprises a liftable axle is probably the control action in most cases also for this kind of arrangement, when there is detected a large axle speed difference, to keep the axles drivingly disconnected from each other while keeping the liftable axle in its lowered, ground engaging position such that there may be a load distribution between the axles.

Depending on the magnitude of the calculated speed difference could different control actions be performed or alerts indicated. For example, in case a calculated angular speed difference between the angular speed of the first and second axles exceeds a "change warning limit" is it indicated that a change of position of the tires from one axle to another should be performed. This can be particularly useful for a wheel suspension system in which there is a liftable axle present, such that wear of a pair of wheels on the liftable axle is substantially less than for a pair of wheels which always engages with the ground. However, it may also be possible that one pair of wheels of a certain axle in general is worn more than a wheel pair of another axle also for a vehicle in which it is not possible to lift any axle.

There may of course be further angular speed difference limits indicating different actions or alerts. In case a calculated angular speed difference between the angular speed of the first and second axles exceeds a second limit, a "check warning limit", is it indicated that a manual check of the conditions of the tires should be performed. This limit could be set to be higher than the "change warning limit" described above. Hence, there can be several different levels or values of angular speed differences between axles and/or individual wheels which may cause different control actions and/or alerts. As previously described, one action when the relative speed difference is rather large is that it is prevented (prohibited) that the axles are drivingly connected. This limit could for example be the same as the second limit ("check warning limit") mentioned above. At another level, for instance with less speed difference, the limit could be set so that the automatic engagement of the axles is aborted, while a driver is alerted about the speed difference of the axles and the axles can be allowed to be manually controlled to be connected. This limit could for example be the same as the first limit ("change warning limit") mentioned above.

In case a difference in the angular speed is detected between the axles/wheels, the pressure level of the respective tires can be detected and controlled. For example, if the pressure levels are detected to be quite different, or deviating from a set desired value for the respective tires, could the pressure level be set to be equalized or set according to the desired values. When the air pressure in the tires have been adjusted accordingly could a new measurement of the angular speed of the axles/wheels be made.

The air pressure in the tires could also be used to compensate for differences in the rolling radius of the wheels indicated by differences in the angular speed between different wheels/axles. Hence, the tire pressure for a pair of wheels on an axle indicated to have a slower angular speed could be controlled to be decreased while a the tire pressure for a pair of wheels on another axle indicated to have a faster angular speed could be controlled to be increase in order to compensate for speed differences between the axles. The relative axle pressure of the axles could also be controlled in dependence of detected angular speeds of the axles to compensate for speed differences.

In addition to compare absolute values of the angle speed difference could it also be taken into account if there is a sudden change of the angular speed difference between different axles or different tires, e.g. by keeping a track record of the differences detected. In this case an alert or warning can be outputted from the ECU if there is a drastic change in the angle speed difference which does not seem to be reasonable when compared to previous measurements. A rather drastic change for a single wheel in its angle speed could for example be an indication of a lowered tire pressure due to a leakage of air from the tire or a sudden pressure loss due to a puncture.

The angular speed can be measured on the axles or on the individual wheels. There is in general an angle speed sensor present in the gear box, the signal from which is proportional to the angular speed of a driven axle, at least if the braking or propulsive torque is rather low and the vehicle is driving under ordinary road conditions. In this case could it be enough to add an angle speed sensor to those axles which must be disconnected from the driveshaft when performing the angle speed measurements. However, in many cases angular speed signals are already present for each wheel from the anti-locking brake system (ABS) for the brakes. Hence, an angular speed can be detected by wheel speed angular sensors for wheels on each side of the axle, for all axles being connectable to the driveshaft in the wheel suspension system. The angular speed for each one of said wheels are used in order to calculate an angular speed difference between said axles. In this case the available sensors can be used.

In order to perform the angle speed measurements certain criteria could be set to get reliable values. The system can be controlled to detect the angular speed of said axles and/or the wheels connected thereto under certain conditions, or to at least indicate if there are conditions present when performing the measurements which may influence the values to not be suitable to be used for calculating an angular speed difference between the angular speed of the first and second axles and/or a difference between the angular speed of the respective wheels of the first and second axles. Hence, when performing the measurements it is generally considered that if one or several of the following criteria are fulfilled will the resulting measurement be more reliable:

- the turning radius of the vehicle is above a prescribed limit, i.e. the vehicle should preferably be driving essentially straight. It is of course possible to compensate for the difference of travelling distance for the different wheels during turning but it is in general better to perform the measurements when driving essentially straight ahead;
- the speed variations of the vehicle are below a prescribed limit. To this criterion could be added that inclination and/or the curvature of the road should be within certain limits. In order to achieve this the measuring time point could be selected by using prediction of the upcoming driving sequence, e.g. by using route or traffic information. For example, GPS and map data in order to select a suitable location or stretch of road for performing the measurements, for instance an essentially flat and straight road portion;
- the tire pressure difference between different wheels is within a prescribed limit. There are indications that the tire pressure not is essential for the angle speed, at least as long as the tire pressure difference are within certain limits, but it is advisable to check the tire pressure for the tires in case of unexpected detected values for the angle speed;
- the load distribution between the different axles is within a prescribed limit. Likewise, as for the tire pressure, the load on the axle can influence the angle speed and should be checked if the measurements seem to result in unexpected values;
- the wheels are not being controlled by an anti-locking braking system or a wheel slip control system while the angular speed is detected. This feature can influence the measurements of the angle speed and the measurements should preferably not be performed while either of these systems are in operation;
- the braking force on the measured wheels is below a prescribed value. If the brakes are applied, a slip condition may exist and the values of the angle speed measurements can be inadequate;
- the driving torque on the measured wheels is below a prescribed value. If there is strong driving torque, there is risk for spin on the driven wheels which can result in inappropriate values of the angular speed for a wheel or an axle;
- the tire temperature, or tire temperature difference, is within a prescribed limit. In general, the temperature of the tires should be about the same but there may be a difference in temperature if one set of tires not have been used for a while (e.g. being lifted up) and the other wheel pair, or pairs of wheels, have been ground engaged and heated due to frictional heat from the road surface while driving; or the axle differentials should be free, i.e. the differentials working on an axle to allow speed compensating between a left and right wheel on the same axle should not be locked. In locked condition, no speed difference is allowed for the respective wheels (left and right) of an axle The invention also relates to a computer program comprising program code means for performing the control steps described herein when said program is run on a computer.

The invention is also encompassing a computer readable medium carrying a computer program comprising program code means for performing the control steps described herein when said program product is run on a computer.

The invention further includes an electronic control unit (ECU) for controlling a wheel suspension system and the electronic control unit (ECU) is configured to perform the control steps as described herein.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1A:
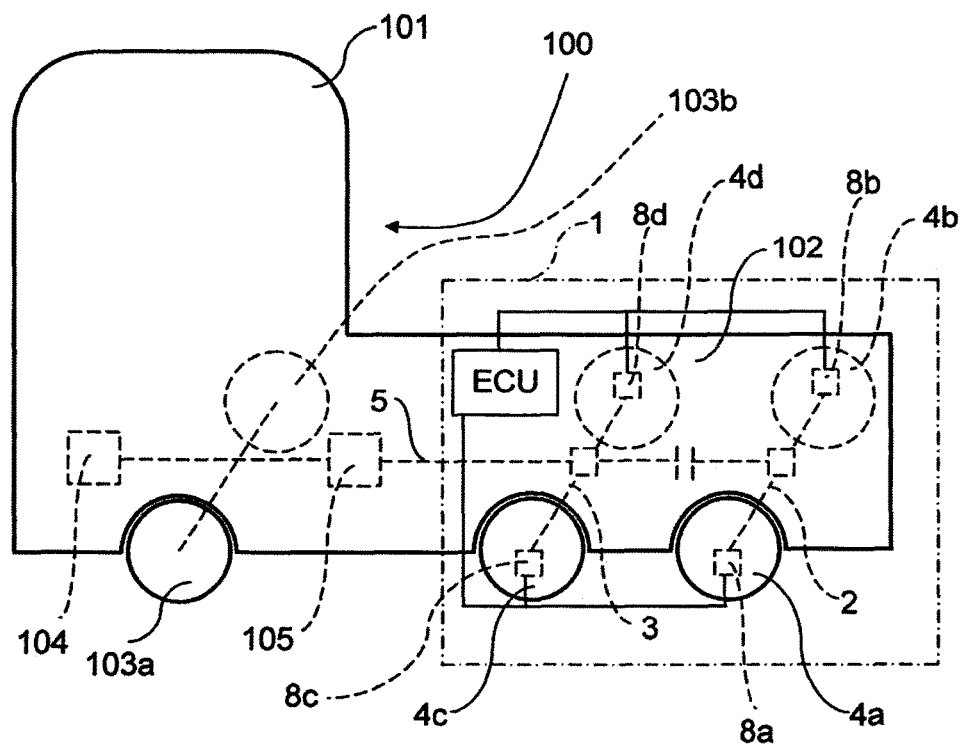
FIGS. 1A-1B show a tractor for a tractor-trailer combination with a wheel suspension system according to a first embodiment the invention.
Figure 1B:
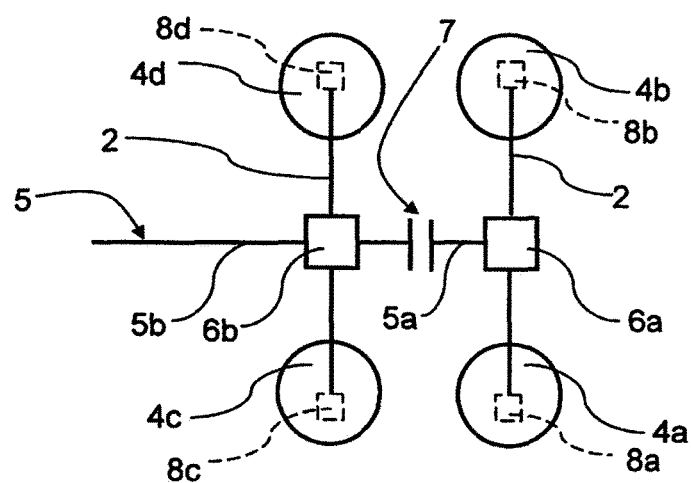

FIGS. 1A and 1B shows a tractor 100 and a wheel suspension system 1 for the tractor 100. The tractor 100 is provided with a driver's cabin 101 and a trailer connecting platform 102 for connecting a trailer to be towed by the tractor. The tractor 100 is provided with a pair of front wheels 103 a, b and the wheel suspension arrangement 1 is arranged in the rear part of the tractor 100. The tractor 100 further comprises a propulsion unit 104, e.g. an ICE, connected to a gear box 105 which in turn is connected to a drive shaft 5 to provide a propulsive force to the tractor. The wheel suspension arrangement 1 comprises a first driven axle 2 and a second driven axle 3. The first driven axle is provided with a first pair of driven wheels 4a, 4b and the second driven axle 3 is provided with a second pair of driven wheels 4c, 4d. The first driven axle 2 is connected to a first portion 5a of the drive shaft 5 via a first differential 6a and the second driven axle 3 is connected to a second portion 5b of the drive shaft 5 via a second differential 6b. The first drive shaft portion 5a and the second drive shaft portion 5b are separated by a coupling 7. The wheel suspension system further comprises a first angle speed sensor 8a for detection of the angle speed of the first wheel 4a, a second angle speed sensor 8b angle speed of the second wheel 4b, a third angle speed sensor 8c for detection of the angle speed of the third wheel 4a and a fourth angle speed sensor 8d for detection of the angle speed of the fourth wheel 4a.

The wheel suspension system further comprises an electronic control unit (ECU) which can either be a separate control unit for the wheel suspension system 1, or be a part of a larger control system for the tractor 100. The electronic control unit (ECU) is connected to the angle speed sensors 8a-d in order to receive input signals for control of the wheel suspension system 1.

Figure 2A:
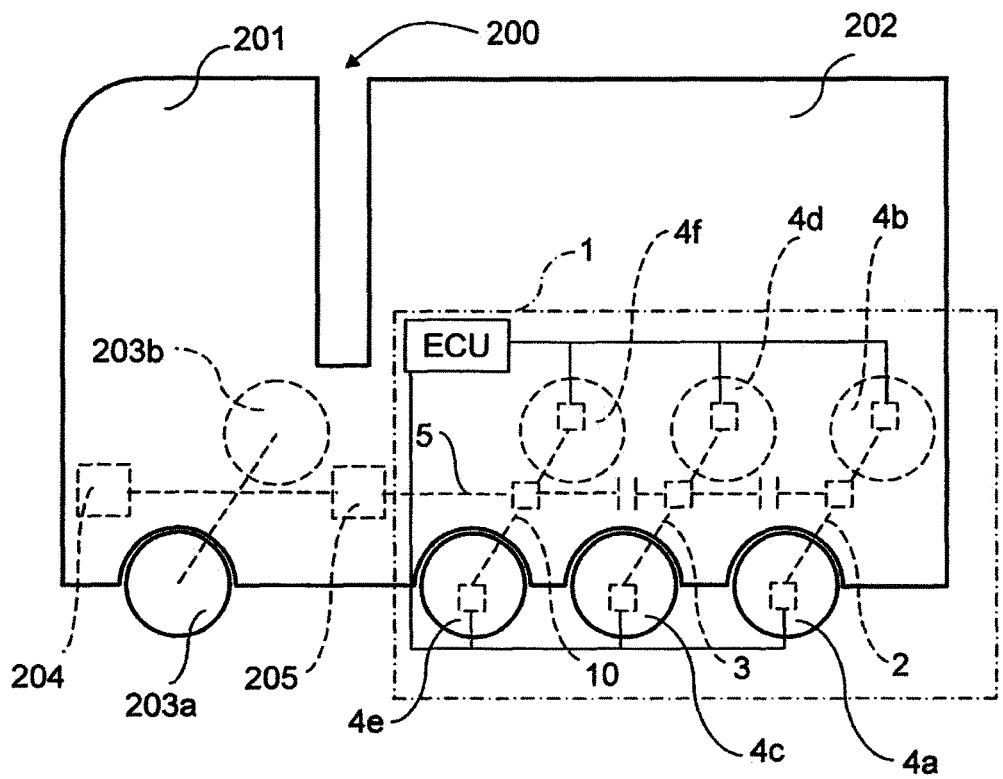
FIGS. 2A-2B show a truck with a wheel suspension system according to a second embodiment the invention.
Figure 2B:
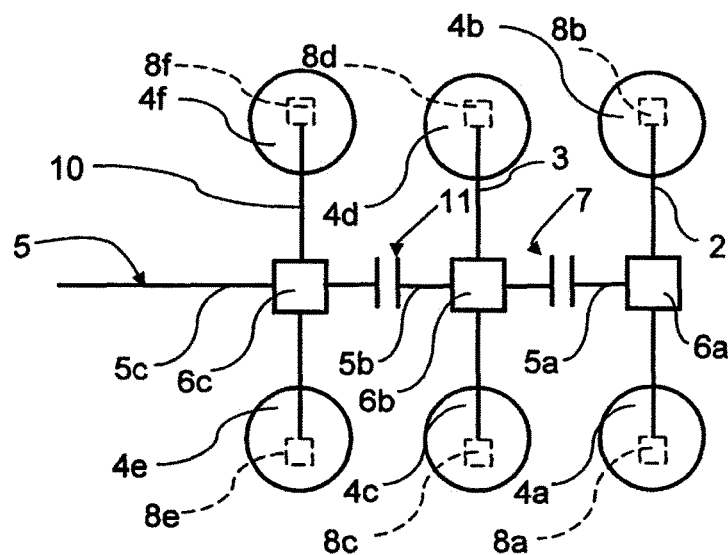

FIGS. 2A and 2B show a cargo truck (or load carrying truck) 200 and a wheel suspension system 1 for the cargo truck 200. The cargo truck 200 is provided with a driver's cabin 201 and a load compartment 202 for carrying a load. The cargo truck 200 is provided with a pair of front wheels 203 a, b and the wheel suspension arrangement 1 is arranged in the rear part of the cargo truck 200. The cargo truck 200 further comprises a propulsion unit 204, e.g. an ICE, connected to a gear box 205 which in turn is connected to a drive shaft 5 to provide a propulsive force to the cargo truck 200.

The wheel suspension arrangement 1 comprises a first driven axle 2, a second driven axle 3 and a third driven axle 10. The first driven axle is provided with a first pair of driven wheels 4a, 4b, the second driven axle 3 is provided with a second pair of driven wheels 4c, 4d and the third driven axle 10 is provided with a third pair of driven wheels 4e, 4f. The first driven axle 2 is connected to a first portion 5a of the drive shaft 5 via a first differential 6a, the second driven axle 3 is connected to a second portion 5b of the drive shaft 5 via a second differential 6b and the third driven axle 10 is connected to a third portion 5c of the drive shaft 5 via a third differential 6c. The first drive shaft portion 5a and the second drive shaft portion 5b are separated by a coupling 7 and the second drive shaft portion and the third drive shaft portion are separated by a second coupling 11. The wheel suspension system 1 further comprises first to fourth angle speed sensors 8a-d arranged to the first to fourth wheels 4a-d as disclosed in the arrangement in FIGS. 1A and 1B. FIGS. 2A and 2B also disclose a fifth angle speed sensor 8e for detection of the angle speed of the fifth wheel 4e and a sixth angle speed sensor 8f for detection of the angle speed of the sixth wheel 4f.

The wheel suspension system further comprises an electronic control unit (ECU) which can either be a separate control unit for the wheel suspension system 1, or be a part of a larger control system for the cargo truck 200. The electronic control unit (ECU) is connected to the angle speed sensors 8a-f in order to receive input signals for control of the wheel suspension system 1.

Figure 2C:
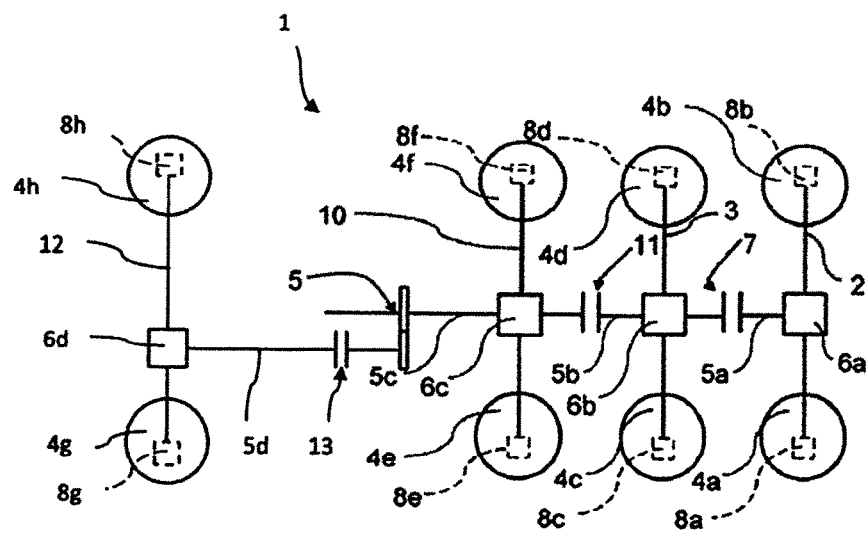
FIG. 2C shows an alternative truck with a wheel suspension system.

To be noted, the wheel suspension system 1 disclosed in FIG. 1B could also be used for the cargo truck 201 in FIG. 2A. Likewise, the wheel suspension system 1 disclosed in FIG. 2B could also be used for the tractor 200. FIG. 2C shows an alternative cargo truck (or load carrying truck) and a wheel suspension system 1 for the cargo truck. Similar to FIG. 2A, the cargo truck is provided with a driver's cabin and a load compartment for carrying a load. The cargo truck is provided with a pair of front wheels and the wheel suspension arrangement 1 is arranged in the rear part of the cargo truck. The cargo truck further comprises a propulsion unit, e.g. an ICE, connected to a gear box which in turn is connected to a drive shaft 5 to provide a propulsive force to the cargo truck. The wheel suspension arrangement in FIG. 2C differs from that in FIG. 2B in that it comprises a driven front axle 12.

The wheel suspension arrangement 1 comprises a first driven rear axle 2, a second driven rear axle 3 and a third driven rear axle 10. The first driven rear axle is provided with a first pair of driven wheels 4a, 4b, the second driven rear axle 3 is provided with a second pair of driven wheels 4c, 4d, the third driven rear axle 10 is provided with a third pair of driven wheels 4e, 4f, and the driven front axle 12 is provided with a fourth pair of driven wheels 4g, 4h. The first driven axle 2 is connected to a first portion 5a of the drive shaft 5 via a first differential 6a, the second driven axle 3 is connected to a second portion 5b of the drive shaft 5 via a second differential 6b, the third driven axle 10 is connected to a third portion 5c of the drive shaft 5 via a third differential 6c, and the driven front axle 13 is connected to a fourth portion 5d of the drive shaft 5 via a fourth differential 6d. The drive shaft 5 can drive the fourth portion 5d of the drive shaft 5 via a gear unit. The first drive shaft portion 5a and the second drive shaft portion 5b are separated by a first coupling 7 and the second drive shaft portion and the third drive shaft portion are separated by a second coupling 11. Similarly, the fourth drive shaft portion 5d and the third drive shaft portion 5c are separated by a third coupling 13. The wheel suspension system 1 further comprises first to sixth angle speed sensors 8a-8f arranged to the first to sixth wheels 4a-4f and also a seventh angle speed sensor 8g for detection of the angle speed of the first front wheel 4g and a sixth angle speed sensor 8h for detection of the angle speed of the second front wheel 4h.

The wheel suspension system further comprises an electronic control unit (not shown in FIG. 2C) which can either be a separate control unit for the wheel suspension system 1, or be a part of a larger control system for the cargo truck. The electronic control unit is connected to the angle speed sensors 8a-8h in order to receive input signals for control of the wheel suspension system 1.

Note that the wheel suspension system 1 shown in FIG. 2C, comprising a driven front axle, could also be used for the cargo truck 101 in FIG. 1A and the cargo truck 201 in FIG. 2A.

Figure 3A:
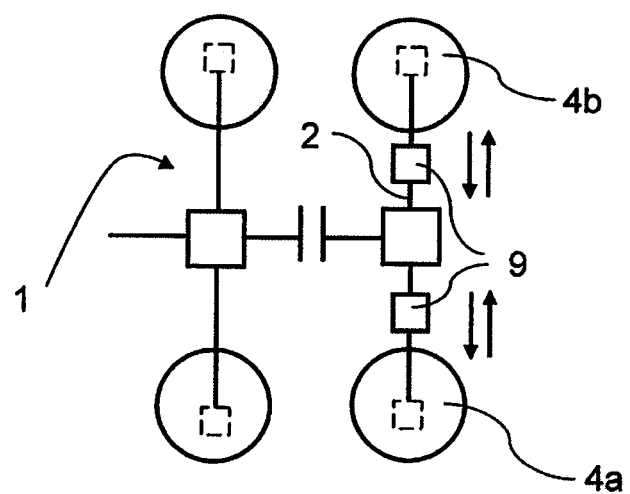
FIGS. 3A-3D show schematic views of different embodiments of the wheel suspension system according to the invention.

In FIGS. 3A-3D are disclosed different embodiments of the wheel suspension system 1 which can be used for example in a tractor 100 or a load carrying truck 200. In FIG. 3A is disclosed a wheel suspension system 1 similar to the one described in FIG. 1B but with the difference that this system has been provided with an axle lifting mechanism 9 working on the first axle 2. The axle lifting mechanism 9 may thus be used to control the first axle 2 to be positioned in a lowered position in which the first wheel pair 4a, b are in contact with the ground and a second raised position in which the first wheel pair 4a, b are lifted up above the surface level.

Figure 3B:
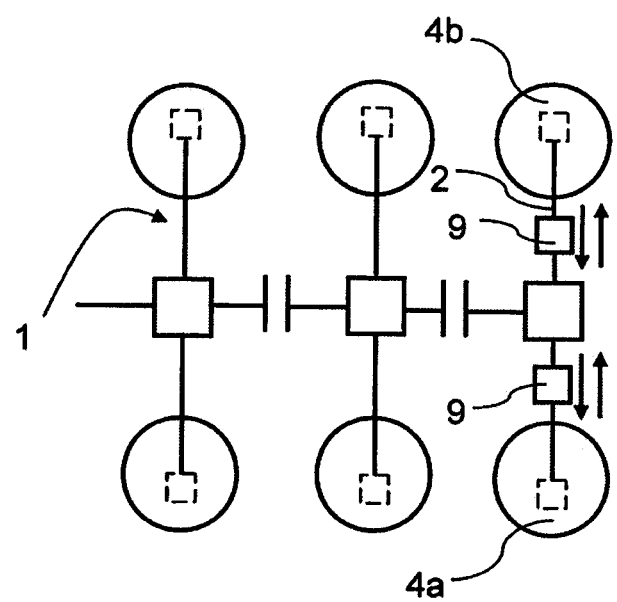

In FIG. 3B is disclosed a wheel suspension system 1 similar to the one described in FIG. 2B but with the difference that this system has been provided with an axle lifting mechanism 9 working on the first axle 2. The axle lifting mechanism 9 may thus be used to control the first axle 2 to be positioned in a lowered position in which the first wheel pair 4a, b are in contact with the ground and a second raised position in which the first wheel pair 4a, b are lifted up above the surface level.

Figure 3C:
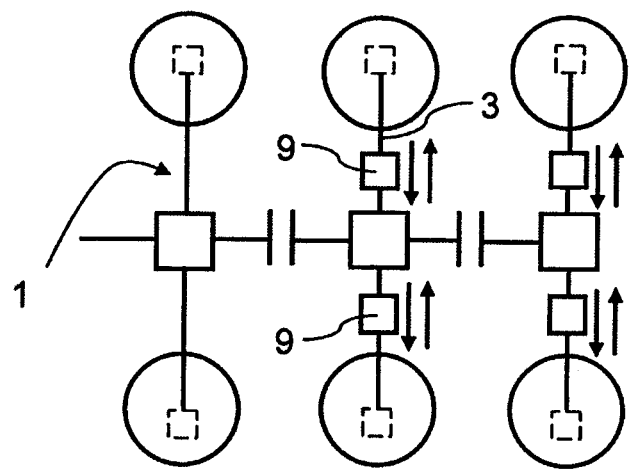

The arrangement shown in FIG. 3C differs from the arrangement in FIG. 3B in that a further axle lifting mechanism 9 has been added and adapted for lifting the second axle 3.

Figure 3D:
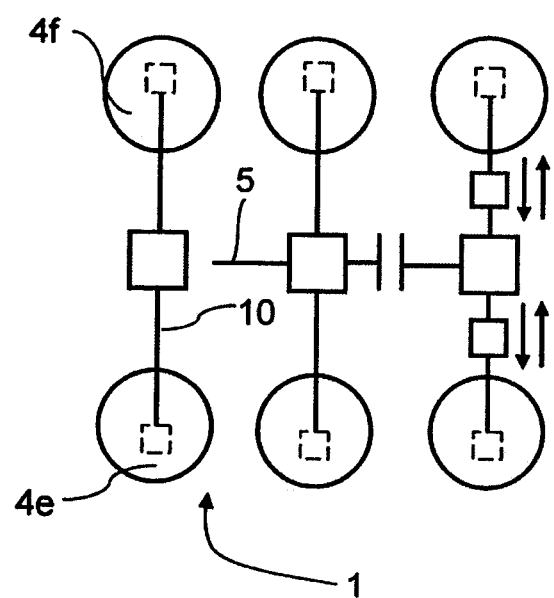

FIG. 3D shows an arrangement which differs from the arrangement disclosed in FIG. 3B in that the third wheel pair 3e, f connected to the third axle 10 not are able to be connected to and powered to the drive shaft 5. Hence, these wheels can be non-driven or powered by another power source.

Figures 4A, 4B:
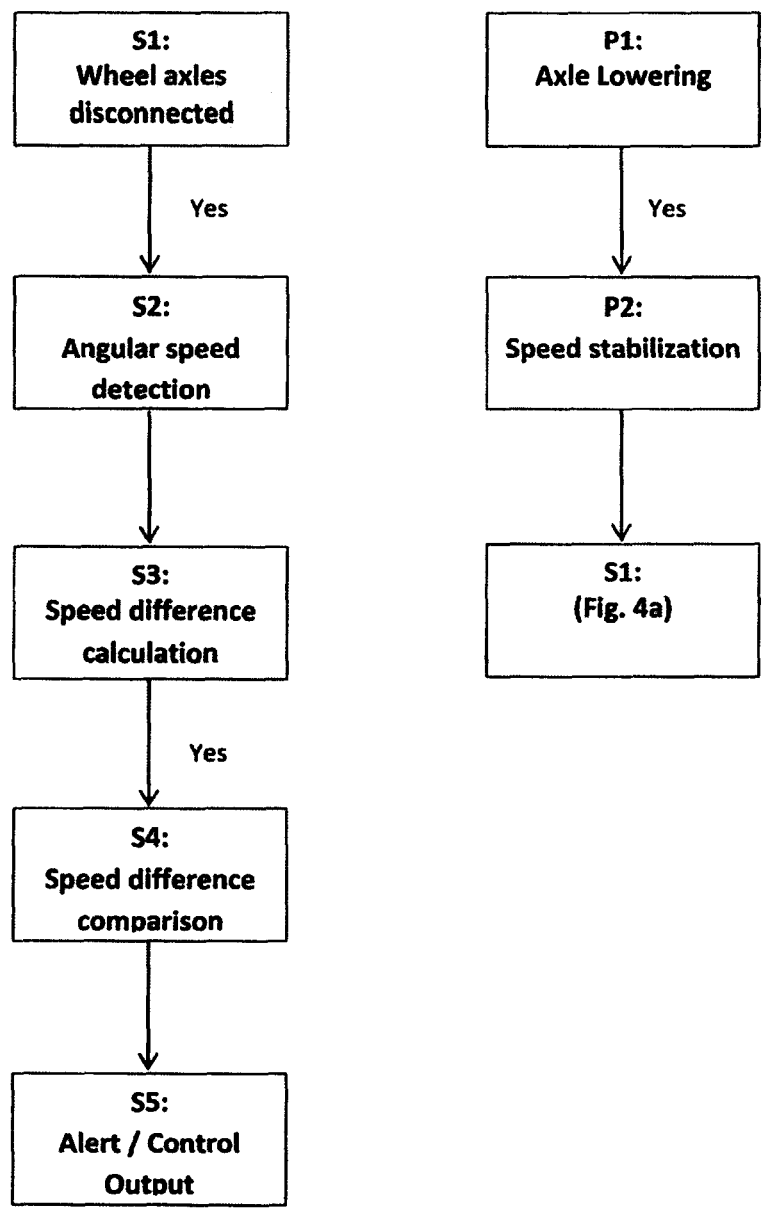
FIGS. 4A-4b show flow charts illustrating a control method for a wheel suspension system according to the invention.

FIG. 4A shows a flow chart of a method according to the invention. The method may for example be used for control of the wheel suspension system 1 for the tractor 100 in FIG. 1A or the wheel suspension system 1 for the load carrying truck 200 in FIG. 2A or for any of the other wheel suspension systems 1 described in FIGS. 3A to 3D.

In the first step, S1, in FIG. 4A, it is checked that the wheel axles for which the angular speed will be measured are disconnected from each other. In case of a tandem axle as shown in FIG. 1 the coupling 7 is controlled to be disconnected such that a first drive shaft portion 5a, comprising a first differential 6a connected to the first driven axle 2, is drivingly disconnected from the second drive shaft portion 5b, comprising a second differential 6b connected to a second driven axle 3. In this state may thus the first and second axles 2, 3 rotate without influencing the speed of each other. In general will this mean that one axle, e.g. the second axle 3, is totally disconnected from the powertrain and the drive shaft 5 and can rotate freely independent of the propulsion unit 104, 204, e.g. an internal combustion engine (ICE), while the other axle, e.g. the first axle 2, is connected to the propulsion unit 104, 204. However, both axles 2, 3 could be disconnected from the powertrain. In case there is a third driven axle 10 present, e.g. as shown in FIG. 2A, this axle 10 could also be disconnected from the other axles 2, 3 by disengaging a second coupling 11 for allowing the axles 2, 3, 10 to rotate independent of each other. In case there are further driven axles present these axles could of course also be set to rotate freely.

An example of such an axle is the driven front axle 12 in FIG. 2C, which can be disconnected from the other axles 2, 3, 10 by disengaging the third coupling 13. When it is assured in in the first step S that the wheel axles 2, 3 10, 12 for which the angular speed will be measured may rotate independently of each other, the second step S2 will follow, in which the angular speed is detected or measured, e.g. by the use of angular speed sensors 8a-h for each one of the wheels 4a-h. A suitable occasion for performing the angular speed measurements in the second step S2 is when there is no torque applied to the driven wheels 4a-h, neither propulsive nor braking torque, and the respective axles are allowed to rotate freely with a minimum of propulsive force or braking torque from the powertrain or other axles. In this aspect could it be advantageously to perform the angular speed measurements when all axles and wheels are disconnected from the powertrain in order to reduce the risk for slip and/or spin of driven wheels 4a-h and thus being able to measure a correct value of the angular speed of the respective axles and/or wheels.

In the next step S3, the detected angular speed of the relevant axles 2, 3, 10, 12 and/or the wheels 4a-h connected thereto, is used in order to calculate an angular speed difference between the angular speed of the axles 2, 3 10, 12 and/or a difference between the angular speed of the respective wheels 4a-h of the wheels.

The calculated angular speed difference between the different axles and/or wheels in the third step S3 is used in the next step S4 to be compared with reference values to establish a comparison of the speed differences. Depending on which kind of angular speed sensors, e.g. angular speed sensors for each wheel or for the respective axles, and what features that are desired to control may different values be set as reference values, e.g. for certain features is it enough with the relative speed while for other features may the absolute speed also be of interest.

In the fifth step S5 the comparison of the angular speed difference between the individual driven wheels 4a-h or driven axles 2, 3, 10, 12 is used as an indication of different wheel radius. An indication of different wheel radius could for example also be used as indication of differences in the circumference of the wheels, rolling radius or other parameters being related to the wheel radius. Based upon a detected difference in the angular speed may different alerts be displayed or control actions performed depending on the magnitude of the difference and/or driving conditions and vehicle characteristics. For example, critical values can be set for the angular speed differences above which different driven axles may not be drivingly connected. The different control actions can have different limits depending on a selected mode (e.g. working/transport) or detected/selected road conditions (e.g. paved/mud/gravel/ice) and have defined levels in a look-up table for different scenarios. Hence, an appropriate alert or control action will be output from the ECU when the angle speed difference has been estimated and compared with predefined values.

A speed difference between a pair of axles or between individual wheels may also be used as an indication of the status of the tires, e.g. wear and tire pressure, and could for example alert a driver to check the tire status or change the tires. Hence, the result of the measurements of the angular speed could be either a direct control signal to the wheel suspension system (or to some part of the vehicle) or to alert a driver of a status or feature to be checked.

In FIG. 4B is described certain steps which can be added to the control method described in FIG. 4A for a vehicle comprising a liftable axle. The steps included therein, preparatory step 1 (P1) and preparatory step 2 (P2), can be performed before the control method described in FIG. 4A is performed.

In the first preparatory step P1 an axle, e.g. the first axle 2, is lowered from an up-lifted resting position by a lifting mechanism 9 acting on the first axle 2 to a lowered position in contact with the ground. The lifting mechanism is designed to be able to shift the position of the first and second wheels 4a, 4b connected to the first axle 2 between being in a working position in contact with the ground surface and being lifted up to be in a resting position above a ground contact level. The lowering is made while keeping a coupling 7 disconnected such that the first axle 2 is drivingly disconnected from the second axle 3.

In the next step, the second preparatory step P2 the coupling 7 is maintained disconnected to keep the driven axles 2, 3 disconnected at least until it is indicated that the detected angular speed values from the angular speed sensors 8a, 8b, indicating the angular speed of the first axle 2 and/or its wheel pairs 4a, 4b, are stabilized. A stabilized speed may for example be decided to be reached when the angle speed sensors 8a, 8b indicates similar speed values and speed fluctuations as other angular speed sensors 8c-h. When the speed is considered to be stabilized may the method proceed as described in FIG. 4A.

It is to be understood that the present invention is not limited to the embodiments described above and illustrated in the drawings; rather, the skilled person will recognize that many changes and modifications can be made within the scope of the appended claims.

The invention claimed is:

1. A control method for a wheel system including a multi-drive axle for a vehicle, the wheel system comprises at least two driven axles whereof each axle is provided with a pair of wheels and connected to a driveshaft via differentials, the driveshaft comprising a coupling positioned between each differential so as to divide the driveshaft into different driveshaft portions which can change between being drivingly connected and disconnected to the driveshaft, the wheel system further comprising angular speed sensors designed to detect an angular speed of the wheels connected thereto, the control method comprising:
controlling the coupling to be disconnected such that each drive shaft portion is drivingly disconnected from at least one further drive shaft portion,
detecting the angular speed of the wheels connected thereto by the angular speed sensors while the driven axles are drivingly disconnected;
using the detected angular speed of the wheels connected thereto in order to calculate a difference between the angular speed of the respective wheels of the driven axles;
comparing the angular speed difference detected between wheels with reference values; and
using the comparison of the angular speed difference to be an indication of different wheel radius and triggering at least one of a warning signal and a control action in case the angular speed difference is outside an allowable value.

2. The control method according to claim 1, wherein the wheel system comprises a lifting mechanism acting on a driven rear axle for being able to shift the position of the wheels on that axle, which constitutes a liftable axle, between being in a working position in contact with a ground surface and being lifted up to be in a resting position above a ground contact level, the method comprising:
lowering the liftable axle from an up-lifted resting position, in which a wheel pair of the liftable axle is above the ground contact level, to a lowered working position, in which the wheels are in contact with the ground, while the coupling is disconnected such that the liftable axle is drivingly disconnected from the other axles;
maintaining the coupling disconnected to keep the driven axles drivingly disconnected at least until it is indicated that the detected angular speed values from the angular speed sensors, indicating the angular speed of the wheel pairs, are stabilized.

3. The control method according to claim 2, wherein if the angular speed difference is outside a critical upper limit the liftable axle is controlled to be drivingly disconnected from the other axles.

4. The control method according to claim 1, wherein if a calculated angular speed difference between the angular speed of the driven axles exceeds a "change warning limit", then it is indicated that a change of position of the tires from one axle to another should be performed.

5. The control method according to claim 1, wherein if a calculated angular speed difference between the angular speed of the driven axles exceeds a "check warning limit", then it is indicated that a manual check of the conditions of the tires should be performed.

6. The control method according to claim 1, wherein the angular speed is detected by wheel speed angular sensors for a wheel on each side of the axles for all axles being connectable to the driveshaft in the wheel system and the angular speed for each one of the wheels is used in order to calculate an angular speed difference between the axles.

7. The control method according to claim 1, wherein the detected angular speed of the wheels used in order to calculate the angular speed difference between at least one of the angular speed of the first and second axles and the difference between the angular speed of the respective wheels of the first and second axles are taken when at least two of the following conditions are fulfilled:
- a turning radius of the vehicle is above a prescribed limit;
- speed variations of the vehicle are below a prescribed limit;
- a tire pressure difference between different wheels is within a prescribed limit;
- a load distribution between the different axles is within a prescribed limit;
- the wheels are not being controlled by an anti-block braking system or a wheel slip control system while the angular speed is detected;
- a braking force on the measured wheels is below a prescribed value;
- a driving torque on the measured wheels is below a prescribed value;
- a tire temperature, or tire temperature difference, is within a prescribed limit;
- the axle differentials are free;
- a measuring time point is selected by predicting an upcoming driving sequence.

8. A computer comprising a computer program for performing the steps of claim 1 when the program is run on the computer.

9. A non-transitory computer readable medium carrying a computer program for performing the steps of claim 1 when the program product is run on a computer.

10. An electronic control unit (ECU) for controlling a wheel system, the electronic control unit (ECU) being configured to perform the steps of the method according to claim 1.

* * * * *